United States Patent [19]
Kwon

[11] Patent Number: 5,801,555
[45] Date of Patent: Sep. 1, 1998

[54] CORRELATIVE DOUBLE SAMPLING (CDS) DEVICE

[75] Inventor: Hyeok-chul Kwon, Pucheon, Rep. of Korea

[73] Assignee: Samsung Electronics Co., Ltd., Kyungki-Do, Rep. of Korea

[21] Appl. No.: 763,734

[22] Filed: Dec. 11, 1996

[30] Foreign Application Priority Data

Dec. 15, 1995 [KR] Rep. of Korea ............ 1995-50684

[51] Int. Cl.$^6$ ............................................. G11C 27/02
[52] U.S. Cl. ......................................... 327/94; 327/96
[58] Field of Search ............................ 327/91, 93, 94, 327/95, 96, 97, 333, 233, 246, 231, 309; 341/122–125; 348/241, 187

[56] References Cited

U.S. PATENT DOCUMENTS

| | | | |
|---|---|---|---|
| 5,221,963 | 6/1993 | Hashimoto et al. | 358/209 |
| 5,299,032 | 3/1994 | Kurita | 358/482 |
| 5,309,183 | 5/1994 | Sasaki et al. | 348/233 |
| 5,374,953 | 12/1994 | Sasaki et al. | 348/65 |
| 5,406,329 | 4/1995 | Kashimura et al. | 348/175 |

*Primary Examiner*—My-Trang Nu Ton
*Attorney, Agent, or Firm*—Sughrue, Mion, Zinn, Macpeak & Seas, PLLC

[57] ABSTRACT

There is provided a correlative double sampling (CDS) device which can effectively and efficiently remove noise from video signal. The CDS device includes at least two sample-and-hold circuits for sampling a video signal output from an image sensor and outputting a predetermined DC level signal, and a differential amplifier. The correlative double sampling device also includes a clamping circuit for DC-clamping a video signal output from the image sensor and applying the DC-clamped signal to the sample-and-hold circuits. At least two re-sample-and-hold circuits are provided for re-sampling the signal output from the sample-and-hold circuits. A level correcting portion is used for correcting the output level of one of the sample-and-hold circuits and one of the re-sample-and-hold circuits, and outputting a signal whose phase is synchronized with the output of the re-sample-and-hold circuits. Sampling noise is removed by alternately passing the output signals of the re-sample-and-hold circuits and the level correcting portion according to a predetermined signal.

19 Claims, 11 Drawing Sheets

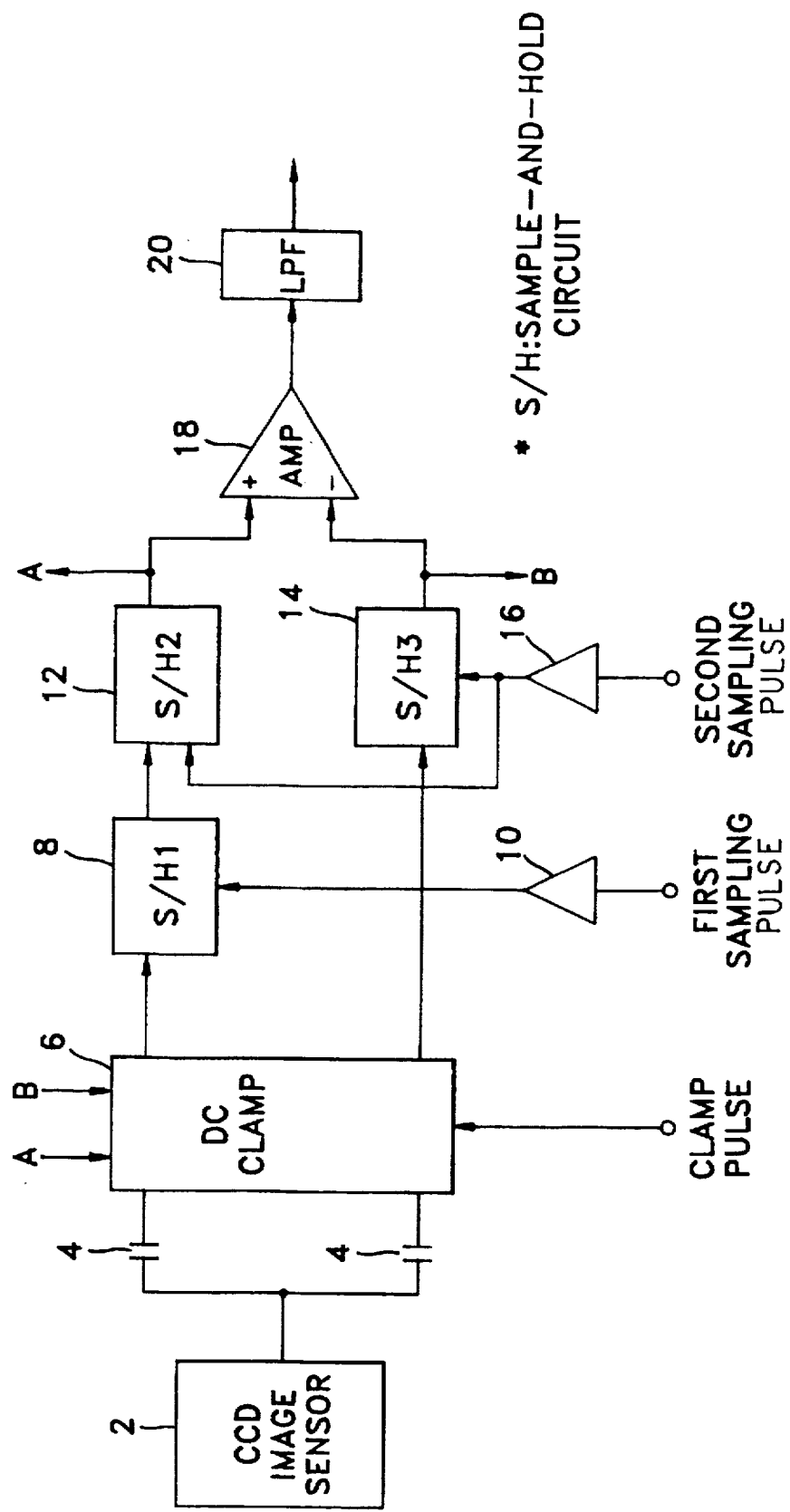

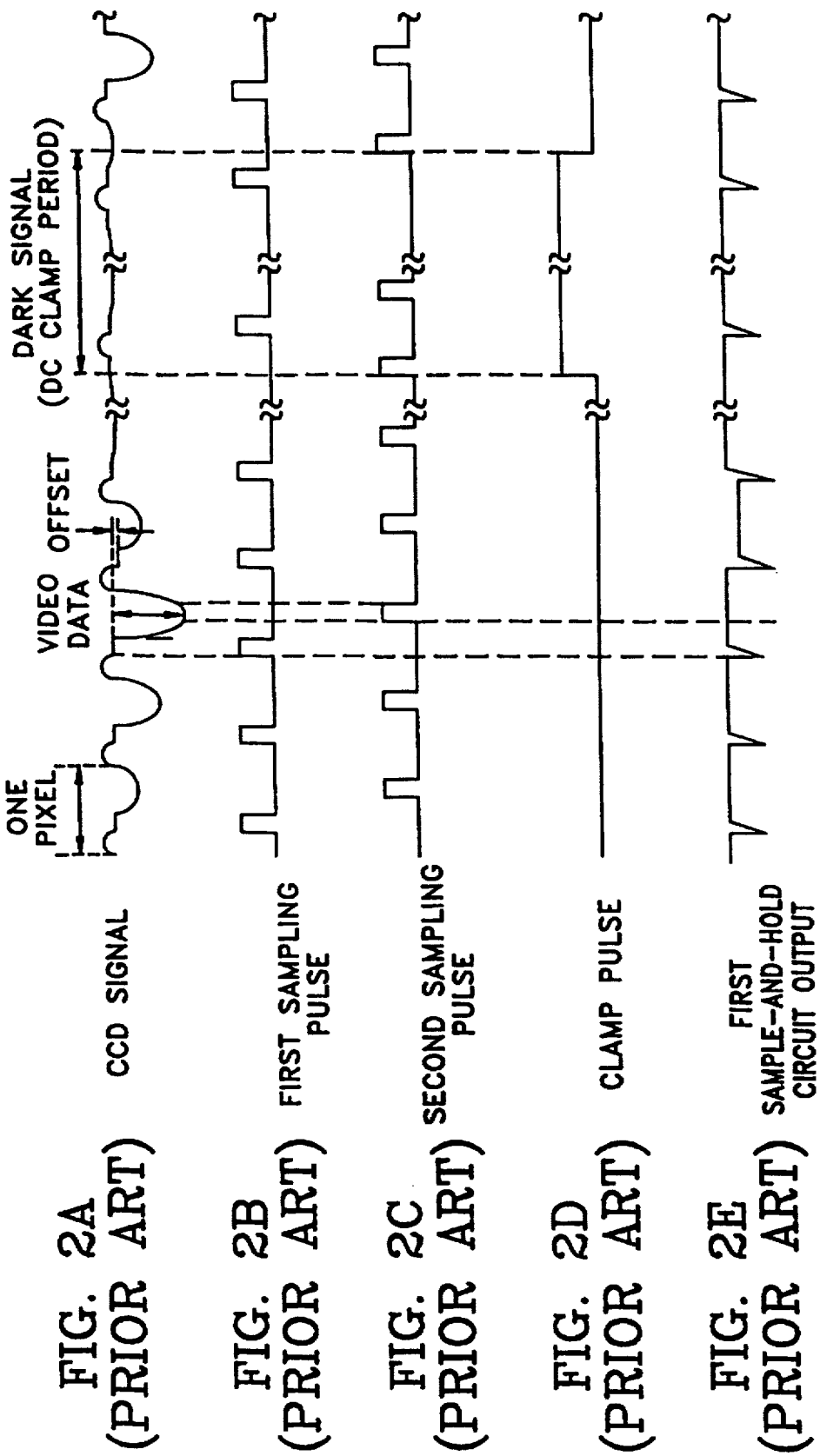

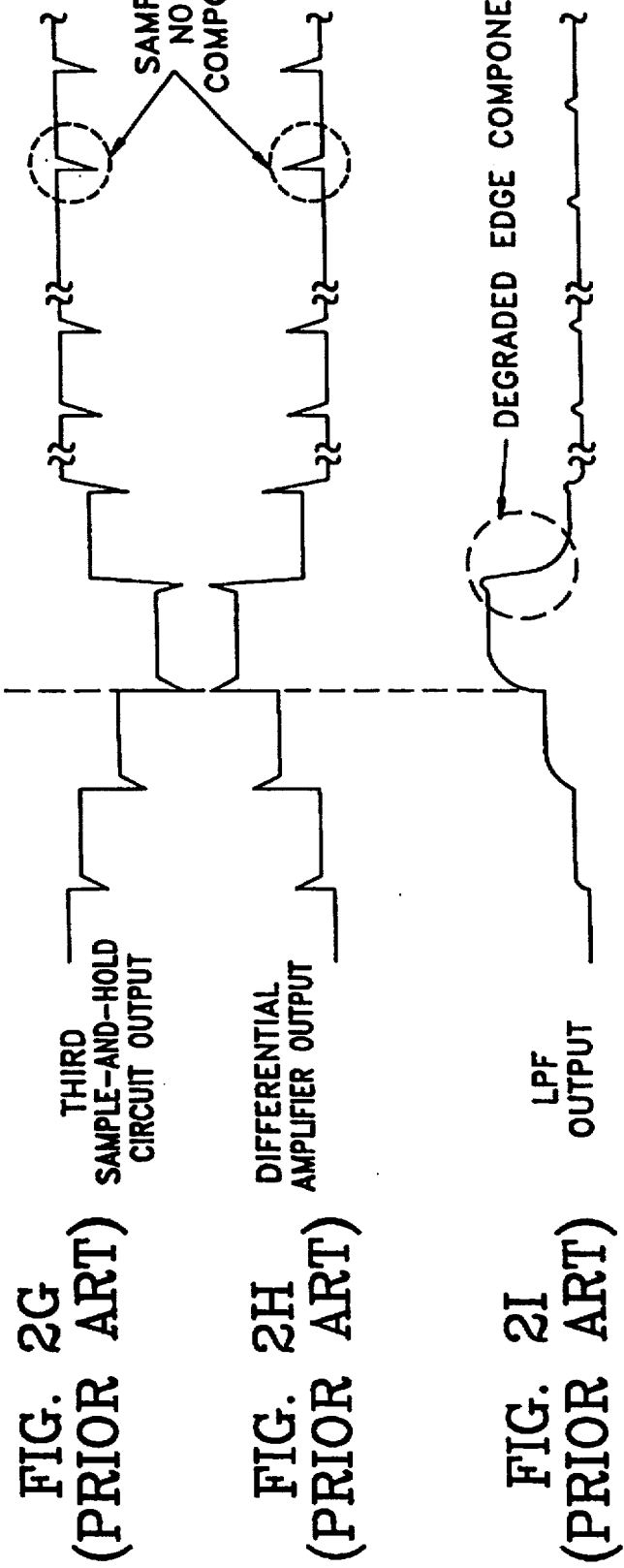
FIG. 2F (PRIOR ART) SECOND SAMPLE-AND-HOLD CIRCUIT OUTPUT
FIG. 2G (PRIOR ART) THIRD SAMPLE-AND-HOLD CIRCUIT OUTPUT
FIG. 2H (PRIOR ART) DIFFERENTIAL AMPLIFIER OUTPUT
FIG. 2I (PRIOR ART) LPF OUTPUT

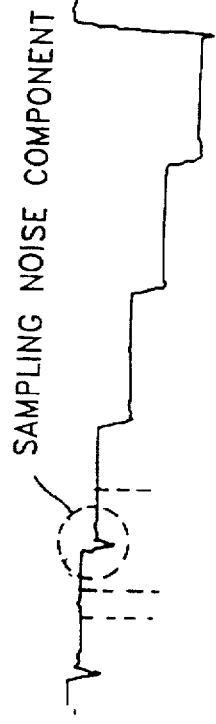
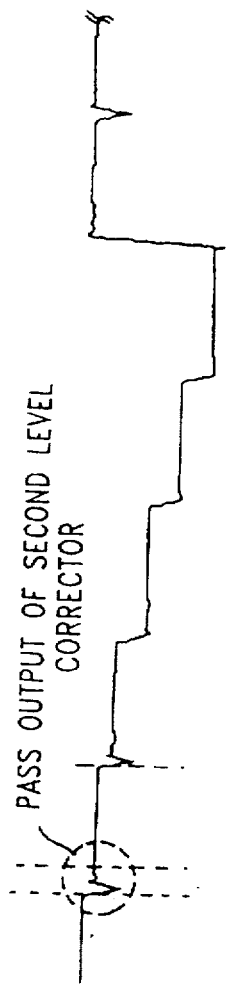
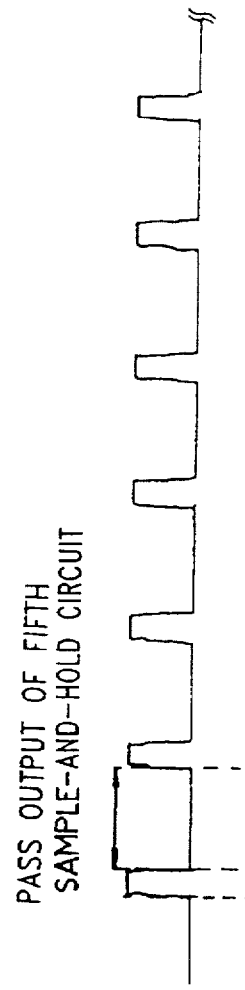
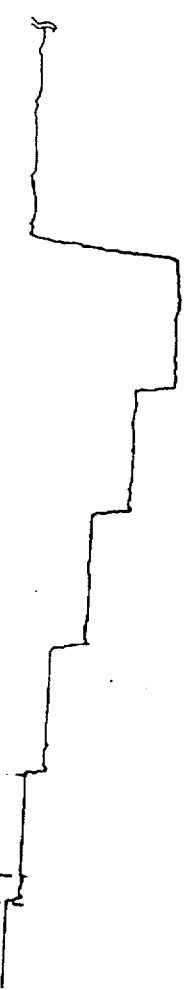
FIG. 9B  OUTPUT OF SECOND LEVEL CORRECTOR
FIG. 9C  OUTPUT OF FIFTH SAMPLE-AND-HOLD CIRCUIT
FIG. 9D  FIRST SAMPLING PULSE
FIG. 9E  OUTPUT OF FIRST NOISE REMOVER

CORRELATIVE DOUBLE SAMPLING (CDS) DEVICE

BACKGROUND OF THE INVENTION

The present invention relates to a correlative double sampling (CDS) device, and more particularly, to a CDS device which can effectively and efficiently remove noise from a video signal.

Generally, during signal processing in a camera using a color and black/white charge coupled device (CCD) image sensor, CDS sampling should first be performed in order to remove noise included in the CCD output signal. The CDS is performed upon input of sampling pulses synchronized with a predetermined signal having a predetermined cycle. A conventional CDS device for processing an output signal of a CCD image sensor is illustrated in FIG. 1, and operating waveforms in relation to FIG. 1 are illustrated in FIG. 2.

Referring to FIGS. 1 and 2, the conventional CDS device has capacitors 4 for coupling the video signal of FIG. 2A, which is the output from the CCD image sensor 2. A DC clamp 6 clamps the signals output from the capacitors 4. The first and third sample-and-hold circuits 8 and 14 are provided for sampling a signal generated in the DC clamp, and a second sample-and-hold circuit 12 is provided for re-sampling data output from the first sample-and-hold circuit 8. The conventional CDS device further includes a differential amplifier 18 for amplifying data output from the second and third sample-and-hold circuits 12 and 14. A low pass filter (LPF) 20 removes high-frequency components from the signal output from the differential amplifier 18. A first buffer 10 is used for buffering a first sampling pulse of FIG. 2B and supplying the buffered pulse to the first sample-and-hold circuit 8, and a second buffer 16 is used for buffering a second sampling pulse of FIG. 2C and supplying the buffered pulse to the second and third sample-and-hold circuits 12 and 14. Here, a clamp pulse shown in FIG. 2D is input to the DC clamp 6, and signals A and B output from the second and third sample-and-hold circuits 12 and 14, respectively, are fed back to the DC clamp 6.

The operation of the conventional CDS device as constituted above will be described with reference to FIGS. 1 and 2.

When an object is photographed using a CCD camera system (not shown), the CCD image sensor 2 outputs the video signal shown in FIG. 2A. The video signal is coupled in the capacitors 4 and then input to the DC clamp 6. The DC clamp 6 reproduces the DC-coupled video signal according to a clamp pulse shown in FIG. 2D, and outputs the reproduced signal to the first and third sample-and-hold circuits 8 and 14. The reproduction is performed during the period of time in which the clamp signal of FIG. 2D is in a "high" level state, that is, the dark-level period of the CCD image sensor 2 output.

Upon input of the signal from the DC clamp 6, the first sample-and-hold circuit 8 repeatedly samples and holds the signal in accordance with the period of the first sampling pulse shown in FIG. 2B, that is, when the first sampling pulse is high and low, respectively, and outputs a signal having the waveform shown in FIG. 2E.

Similarly, upon input of the signal from the DC clamp 6, the third sample-and-hold circuit 14 repeatedly samples the signal in accordance with the period of the second sampling pulse shown in FIG. 2C, that is, when the second sampling pulse is high and low, respectively, and outputs a signal of the waveform shown in FIG. 2G.

In addition, the second sample-and-hold circuit 12 re-samples the signal sampled in the first sample-and-hold circuit 8 upon input of the second sampling pulse. Thus, as shown in FIG. 2F, the waveforms of the signal output from the second sample-and-hold circuit 12 has the same period as that of the output waveform of the third sample-and-hold circuit 14, as shown in FIG. 2G.

As described above, when the output signals including sampling noise are output from the second and third sample-and-hold circuits 12 and 14 to the differential amplifier 18, the differential amplifier 18 generates a difference signal shown in FIG. 2H. The LPF 20 suppresses any sampling noise remaining in the high-frequency portion of the signal and outputs a signal having the waveform shown in FIG. 2I, upon input of the signal of FIG. 2H from the difference amplifier 18. However, an edge component of the video information is degraded simultaneously with the suppression of the high-frequency noise, as shown in FIG. 2I.

As a way to cope with noise produced during the sampling of the signal, that is, noise related to a transient phenomenon of active devices such as transistors and diodes, or a sample-and-hold capacitor, the conventional CDS device as described above outputs a signal component by processing both positive and negative signals obtained by the CDS and suppresses a noise component of the same phase using a common mode rejection ratio (CMRR).

However, in the above method, noise suppression depends on the characteristics of the differential amplifier 18. That is, CMRR characteristics of a general differential amplifier are good in the low frequency portion of a signal, whereas they are degraded in the high frequency portion. Therefore, sampling noise distributed in a band of about 10 MHz or above cannot be suppressed.

Furthermore, the conventional CDS device uses an LPF to reduce sampling noise which cannot be removed in the differential amplifier and is distributed in the high frequency band. However, this method influences certain component of the video signal component as described above, thus attenuating gains for edge components distributed in the high frequency band as well. Consequently, resolution, which is one of the most important characteristics of a video signal, is lowered.

In addition, the conventional CDS device can extract noise components distributed in the high frequency band by using a high pass filter (HPF), shifting the phase of the extracted noise components by 180°, and then adding the phase-shifted components to an original signal, which also adversely influences the video signal components and thus lowers resolution.

SUMMARY OF THE INVENTION

To overcome the above problems, an object of the present invention is to provide a correlative double sampling device which can effectively and efficiently reduce noise from the video signal.

Another object of the present invention is to provide a correlative double sampling device which can increase resolution by minimizing the impact of noise on the video signal and can also be realized using less hardware.

To achieve the above objects, there is provided a correlative double sampling device having at least two sample-and-hold circuits for sampling the video signal and outputting a predetermined DC level signal, and a differential amplifier. The correlative double sampling device further comprises:

a clamping circuit for DC-clamping a video signal output from the image sensor and applying the DC-clamped signal to the sample-and-hold circuits;

at least two re-sample-and-hold circuits for re-sampling the signal output from the sample-and-hold circuits;

a level correcting circuit for correcting the output level of one of the sample-and-hold circuits and one of the re-sample-and-hold circuits, and outputting a signal whose phase is synchronized with the output of the re-sample-and-hold circuits; and the sampling noise is removed by alternately passing the output signals of the re-sample-and-hold circuits and the level correcting circuit according to the predetermined signal.

BRIEF DESCRIPTION OF THE DRAWINGS

The above objects and advantages of the present invention will become more apparent by describing in detail a preferred embodiment thereof with reference to the attached drawings in which:

FIG. 1 is a schematic diagram of a conventional CDS device;

FIGS. 2A through 2I illustrate operating waveforms of the conventional CDS device of FIG. 1;

FIGS. 9A through 9E are diagrams explaining the operation of the noise removers according to the present invention.

DETAILED DESCRIPTION OF THE PREFERRED EMBODIMENT

Figure 3:
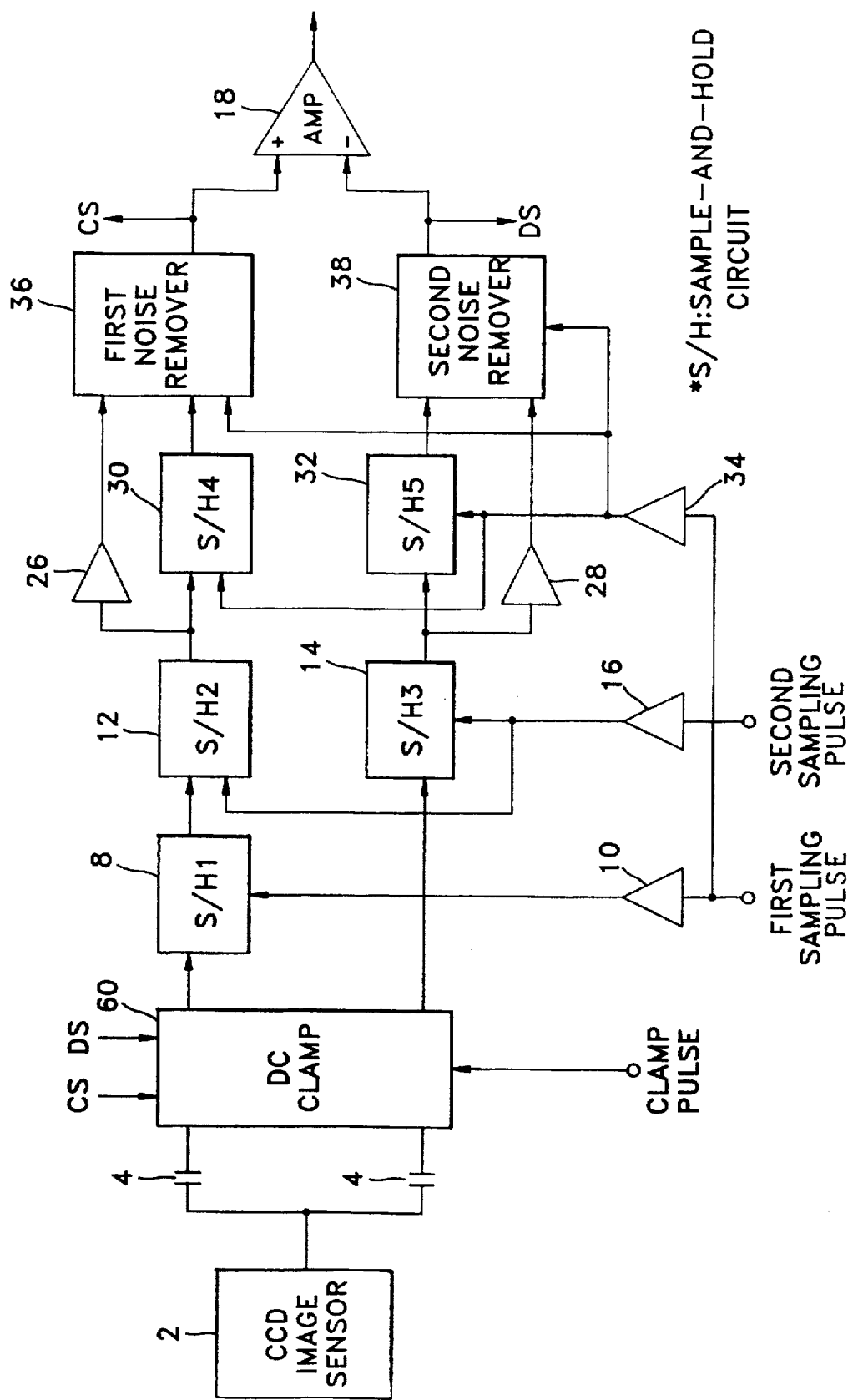
FIG. 3 is a schematic diagram of a CDS device according to an embodiment of the present invention.
Figure 4:
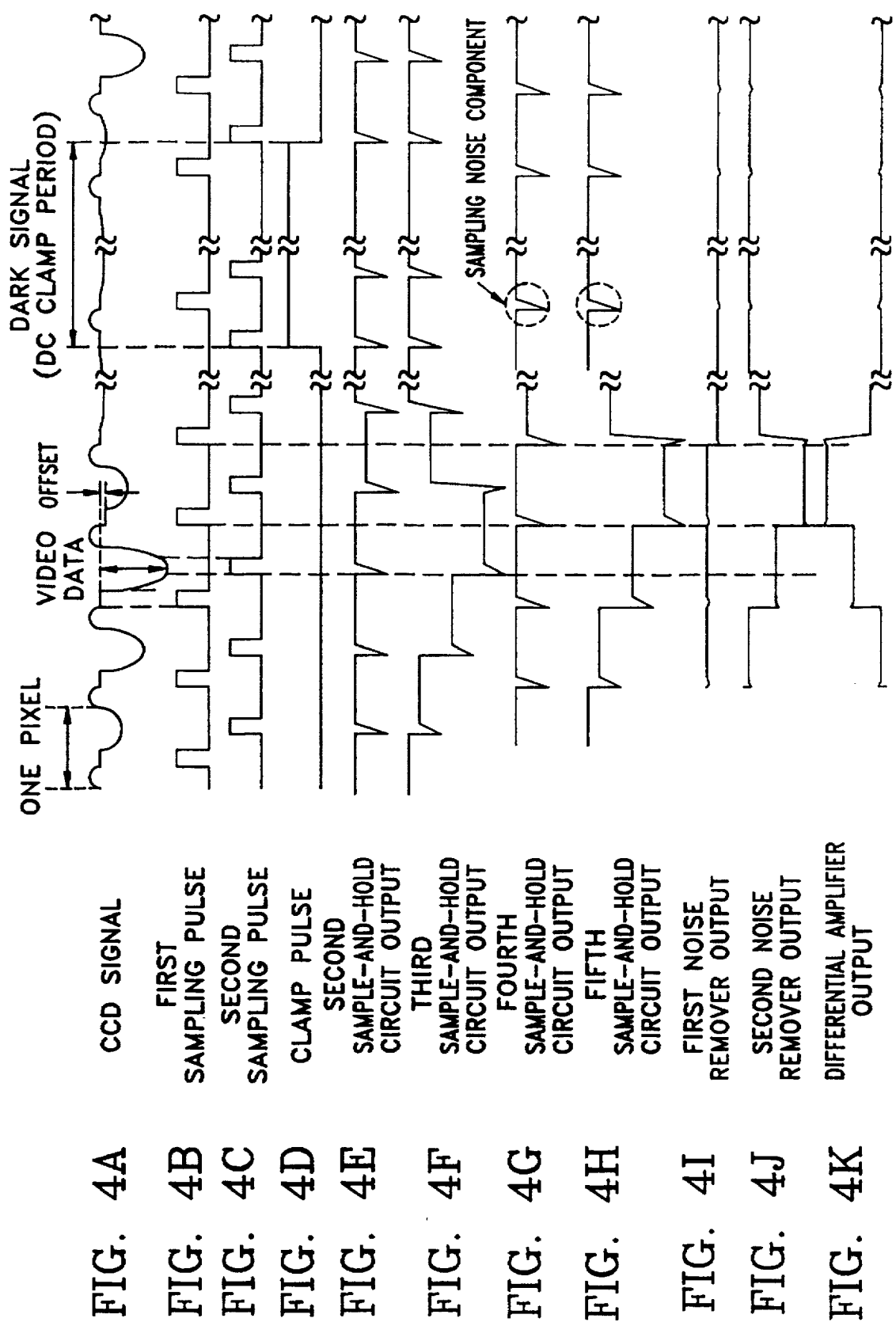
FIGS. 4A through 4K illustrate operating waveforms of the CDS device of FIG. 3.

Referring to FIG. 3, a CDS device according to the preferred embodiment of the present invention employs a level corrector and a noise remover instead of the conventional LPF or HPF. The CDS device of the present invention has similar basic components as those of the conventional CDS device. Specifically, the capacitors 4 are used for DC-coupling a video signal output from the CCD image sensor 2 (FIG. 4A). A DC clamp 60 is used for clamping signals output from the capacitors 4. The first and third sample-and-hold circuits 8 and 14 are for sampling and holding the signal generated in the DC clamp 60, and the second sample-and-hold circuit 12 is for re-sampling the signal output from the first sample-and-hold circuit 8. The first buffer 10 is for buffering a first sampling pulse of FIG. 4B and supplying the buffered sampling pulse to the first sample-and-hold circuit 8, and the second buffer 16 is for buffering a second sampling pulse of FIG. 4C and supplying the buffered sampling pulse to the second and third sample-and-hold circuits 12 and 14.

Here, like reference numerals are assigned to the same components as those of the conventional CDS device in terms of operation, and the description of such components is omitted.

The CDS device of the present invention further includes the following components. Fourth and fifth sample-and-hold circuits 30 and 32 are provided for sampling the signals output from the second and third sample-and-hold circuits 12 and 14. First and second level correctors 26 and 28 are provided for correcting the DC levels of signals output from the second and third sample-and-hold circuits 12 and 14, respectively. First and second noise removers 36 and 38 are provided for receiving a pair of signals output from the first level corrector 26 and the fourth sample-and-hold circuits 30, and a pair of signals output from the second level corrector 28 and the fifth sample-and-hold circuit 32, respectively, and alternately outputting one of each pair of signals so that noise components included in the output signals of the fourth and fifth sample-and-hold circuits 30 and 32 are removed. A differential amplifier 18 is used for differentially amplifying the outputs of the first and second noise removers 36 and 38. Here, the fourth and fifth sample-and-hold circuits 30 and 32, and the first and second noise removers 36 and 38 receive the first sampling signal of FIG. 4B which is buffered in a third buffer 34. Signals CS and DS output from the first and second noise removers 36 and 38, respectively, are fed back to the DC clamp 60.

Figure 5:
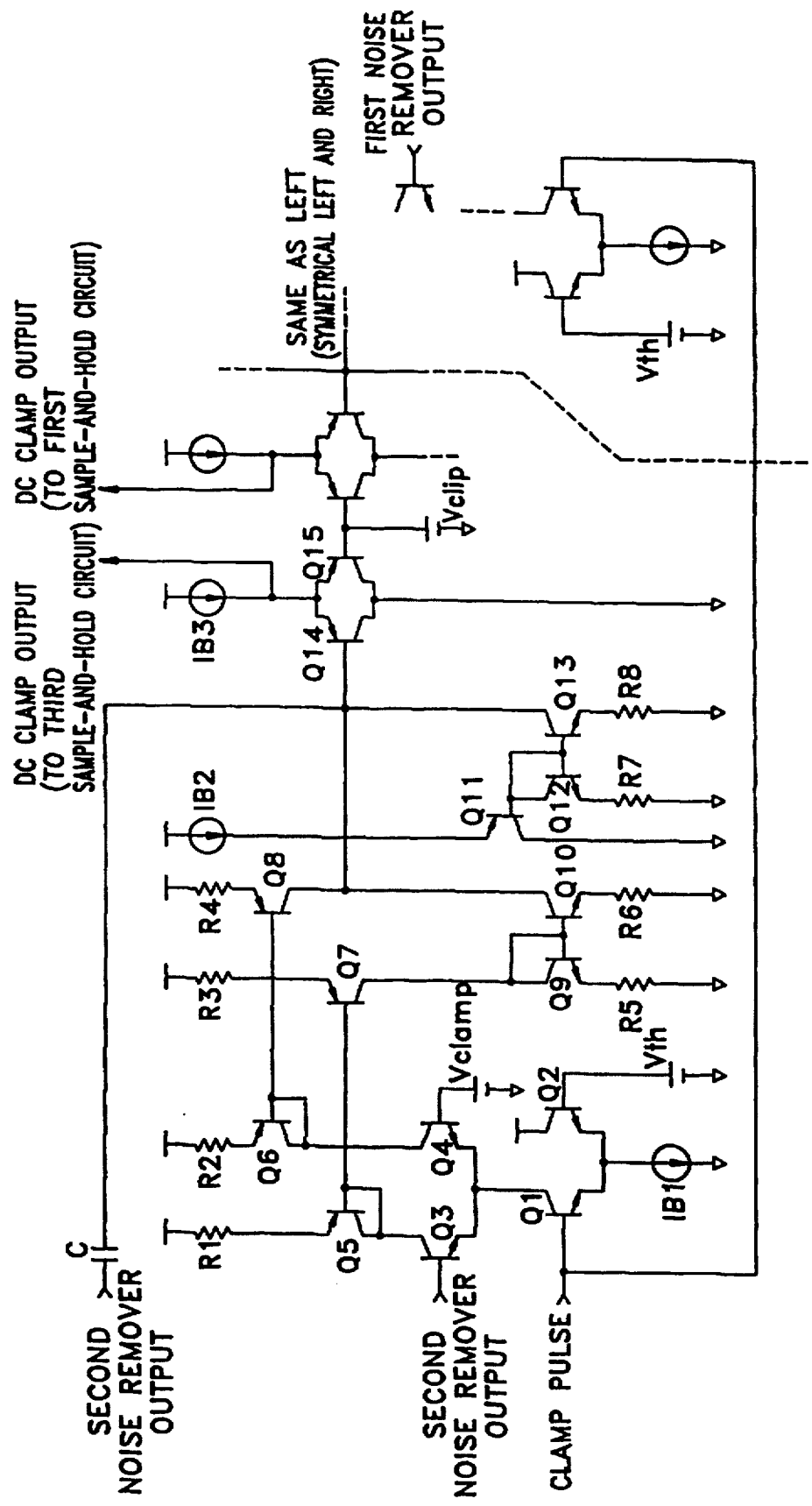
FIG. 5 is a circuit diagram of an embodiment of the clamp shown in FIG. 3.
Figure 6:
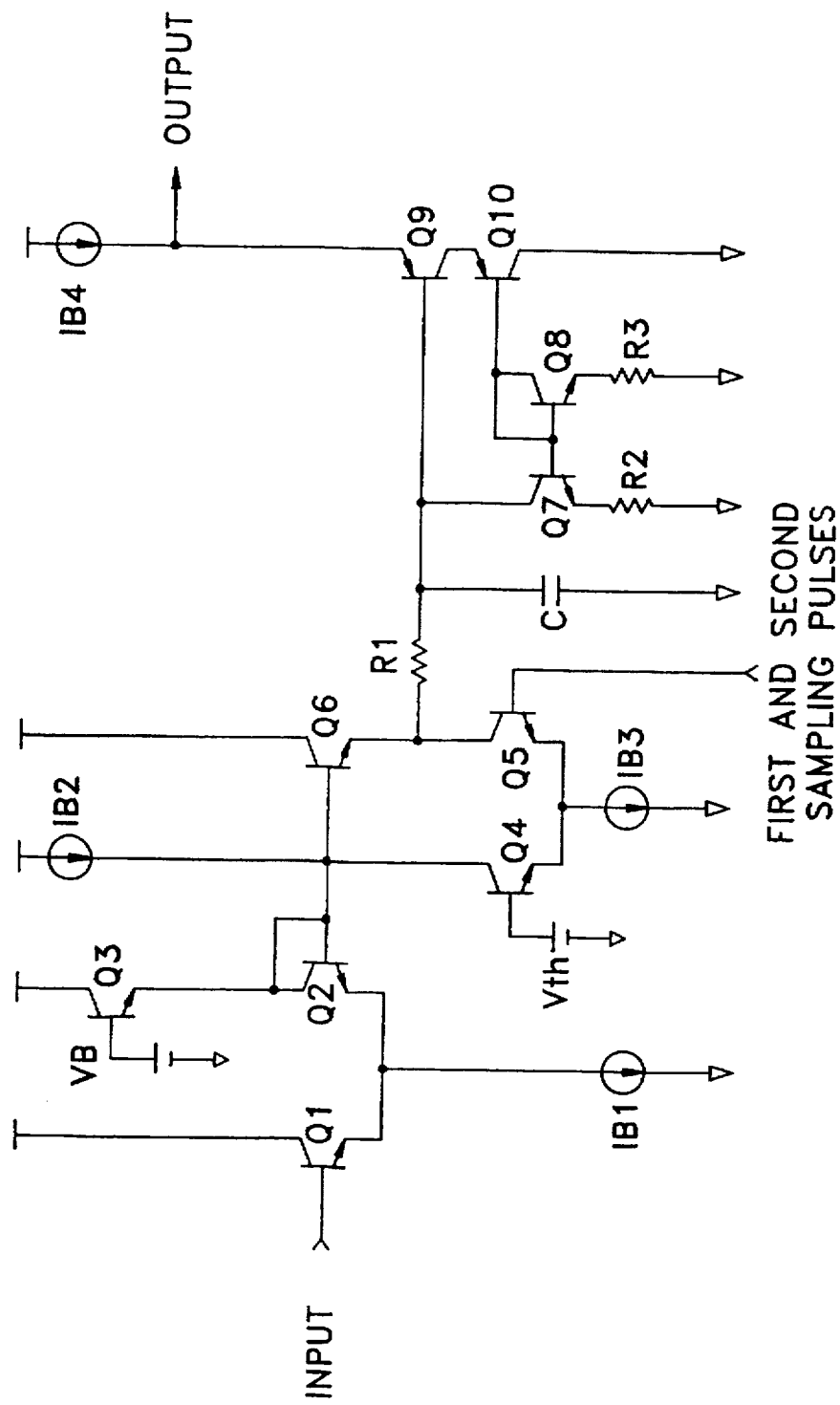
FIG. 6 is a circuit diagram of an embodiment of the sample-and-hold circuits of FIG. 3.
Figure 7:
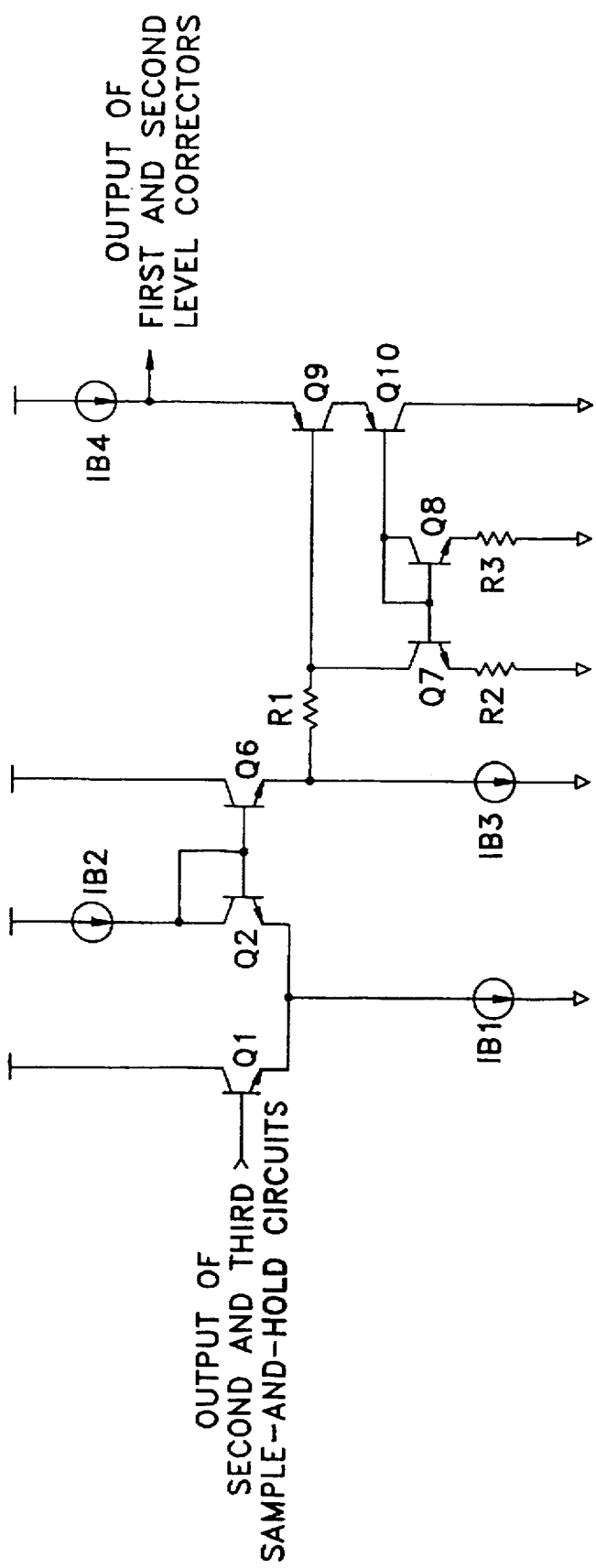
FIG. 7 is a circuit diagram of an embodiment of the level corrector of FIG. 3.
Figure 8:
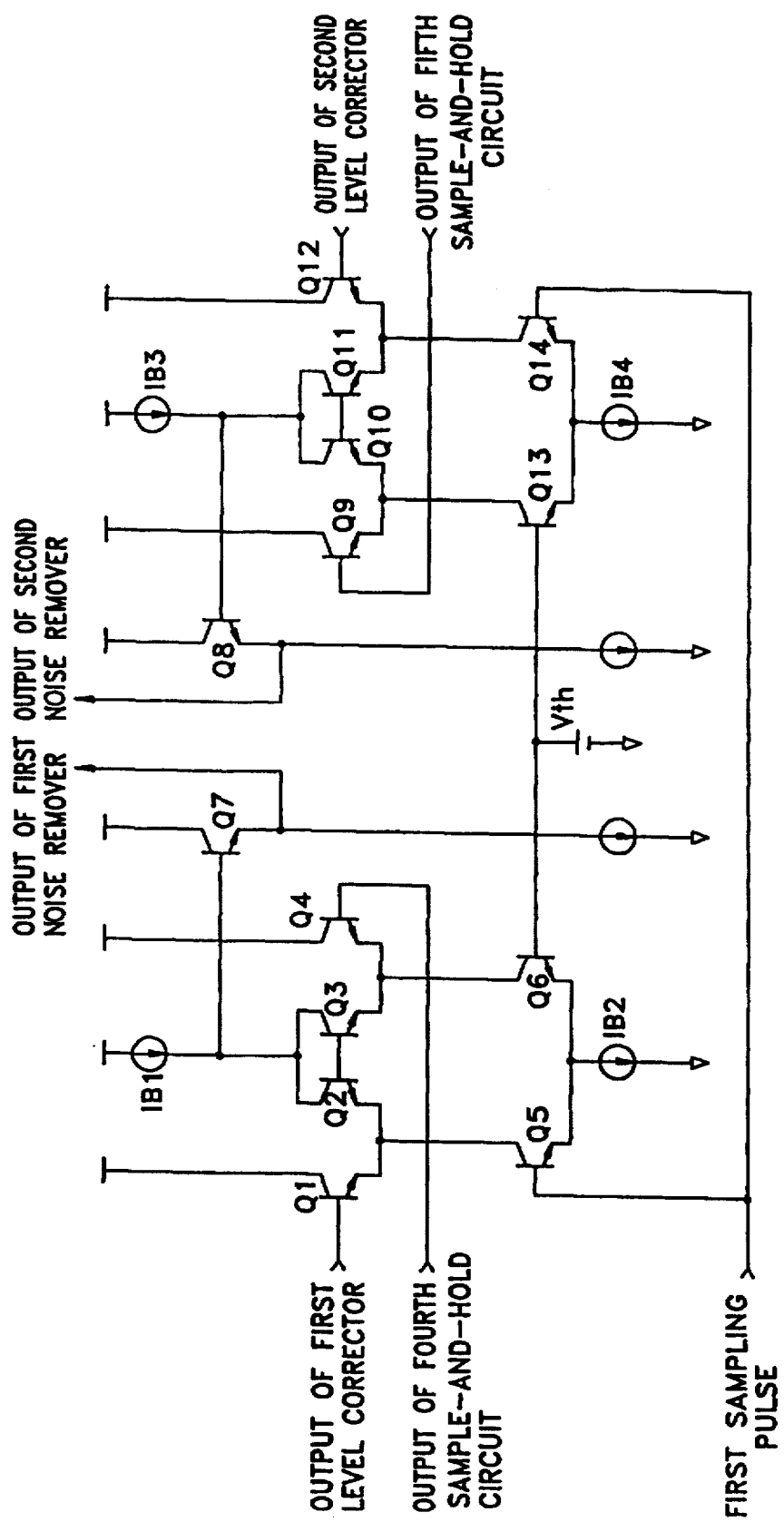
FIG. 8 is a circuit diagram of an embodiment of the noise removers of FIG. 3.
Figure 9A:
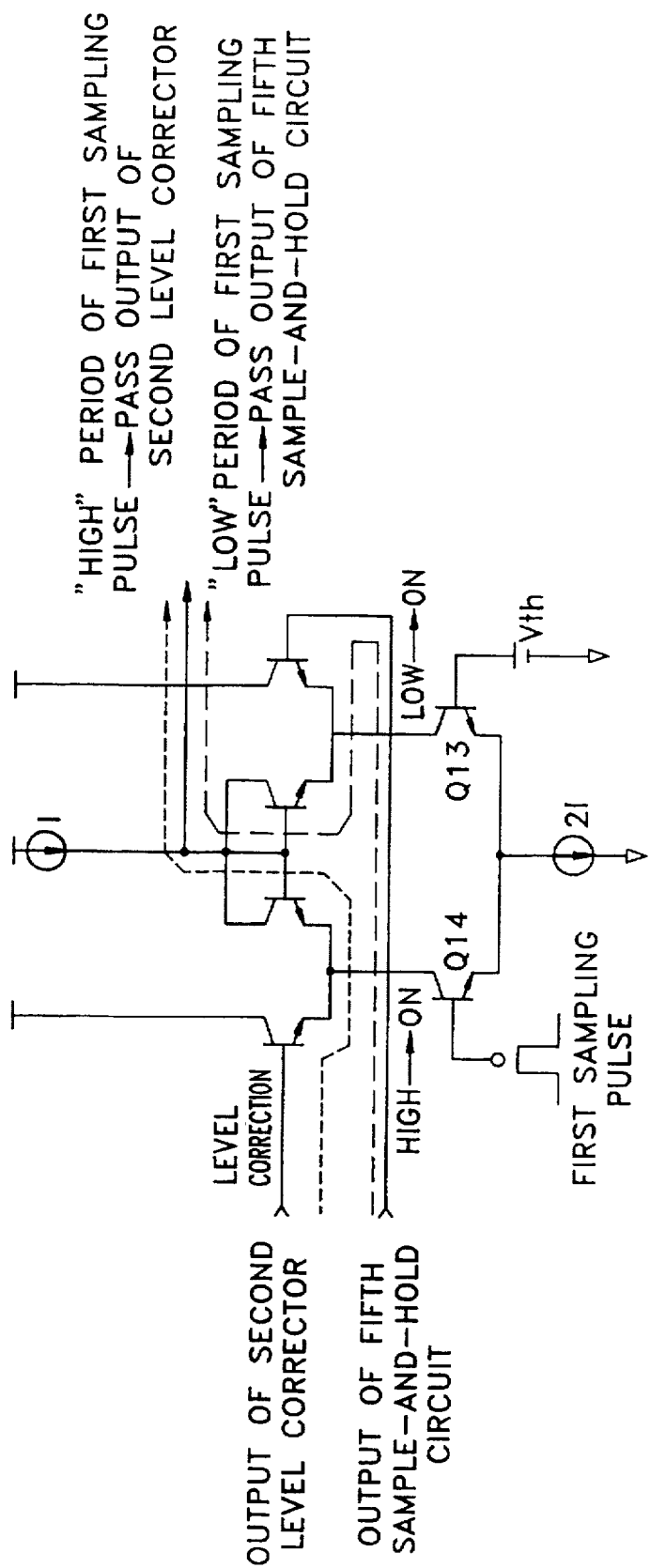

As shown in FIG. 5, the DC clamp 60 employs a negative feed back method and has a plurality of transistors, resistors, and capacitors, which constitute a current mirror and other circuits. The sample-and-hold circuits, the level correctors, and the noise removers each have a plurality of transistors, resistors, and capacitors, as shown in FIGS. 6, 7, and 8, respectively.

The operation of the CDS device of the present invention will be described in detail, referring to FIGS. 3 through 8.

In the CDS device of the present invention, when an object is photographed using a CCD camera system, the CCD image sensor 2 outputs the video signal shown in FIG. 4A, as in the conventional CDS device. The video signal is coupled by the capacitors 4 and output to the DC clamp 60. The DC clamp 60 reproduces the DC-coupled video signal according to a clamp pulse shown in FIG. 4D, and outputs the reproduced signal to the first and third sample-and-hold circuits 8 and 14. The reproduction is performed during the period of time in which the clamp signal shown in FIG. 4D is in a "high" level state, that is, a dark level period of the output of the CCD image sensor 2. In addition, when the signal is output from the DC clamp 60, the first sample-and-hold circuit 8 repeatedly sample-and-holds the signal in accordance with the period of the first sampling pulse of FIG. 4B, that is, when the first sampling pulse is high and low, respectively, and outputs a signal having the waveform shown in FIG. 4E. Similarly, when the signal is output from the DC clamp 60, the third sample-and-hold circuit 14 repeatedly sample-and-holds the signal in accordance with the period of the second sampling pulse of FIG. 4C, that is, when the second sampling pulse is high and low, respectively, and outputs a signal having the waveform shown in FIG. 4F. Thus, as shown in FIG. 4E, the waveform of the signal output from the second sample-and-hold circuit 12 has the same period as that of the output waveform of the third sample-and-hold circuit 14, as shown in FIG. 4F.

As described above, when signal waveforms having the same period are output from the second and third sample-and-hold circuits 12 and 14, the fourth and fifth sample-and-hold circuits 30 and 32 sample the signals using the first sampling pulse of FIG. 4B, and output the signal waveforms shown in FIGS. 4G and 4H. In addition, the output signals of the second and third sample-and-hold circuits 12 and 14 are input to the first and second level correctors 26 and 28, respectively, to correct the DC level between the input and output of each sample-and-hold circuit. The first level corrector 26 makes the output of the second sample-and-hold circuit 12 equal to the DC output of the fourth sample-andhold circuit 30, and the second level corrector 28 makes the output of the third sample-and-hold circuit 14 equal to the DC output of the fifth sample-and-hold circuit 32. The output signals of the first and second level correctors 26 and 28 are input to the first and second noise removers 36 and 38, respectively.

As described above, the output signals of the first and second level correctors 26 and 28, and the fourth and fifth sample-and-hold circuits 30 and 32, are input to the first and second noise removers 36 and 38, respectively. Then, the first noise remover 36 alternately outputs the outputs of the first level corrector 26 and the fourth sample-and-hold circuit 30 according to the first sampling pulse of FIG. 4B, which results in a signal free of sampling noise (shown in FIG. 4I) being input to the positive terminal of the differential amplifier 18. Similarly, the second noise remover 38 alternately outputs the outputs of the second level corrector 28 and the fifth sample-and-hold circuit 32 according to the first sampling pulse of FIG. 4B. Consequently, a signal free of sampling noise (shown in FIG. 4J), is input to the negative terminal of the differential amplifier 18. Then, upon the input of the signals to the positive and negative input terminals of the differential amplifier 18, the differential amplifier 18 outputs the difference between the signals. In this case, more noise is suppressed by the CMRR characteristics of the differential amplifier 18.

FIG. 5 illustrates a specific embodiment of the DC clamp 60 of the present invention. The DC clamp 60, which employs a negative feed back method for DC-reproduction in conformity with the operating point of the circuit, equates the DC voltages output from the first and second noise removers 36 and 38 which are fed back to the DC clamp 60 to a clamp voltage Vclamp by comparing their outputs in transistors Q3 and Q4. The above operation of the DC clamp 60 is performed during the period of time in which the clamp pulse of FIG. 4A is in a "high" level state, that is, during the dark level period of the output signal of the CCD image sensor 2. For example, when the DC voltage output from the second noise remover 38 is higher than the clamp pulse Vclamp, a current mirror including transistors Q5, Q7, Q9, and Q10 discharges the capacitor C, thus decreasing the base potential of a transistor Q14 and the DC voltage of the clamp output. As a result, the DC voltage of the entire loop including the sample-and-hold circuits falls, and thus the DC clamp 60 repeats the above operation until the fed back DC voltage of the second noise remover 38 equals the clamp voltage Vclamp.

When the DC voltage of the second noise remover 38 is lower than the clamp voltage Vclamp, the DC clamp 60 equates the DC voltage of the second noise remover 38 to the clamp voltage Vclamp by charging the capacitor C in a current mirror including transistors Q6 and Q8. Here, assuming that the amount of current with respect to the capacitor C is êI and the fed back DC voltage is Vfbk, $$êI=[Vt/(IB1/2)]\times(Vfbk-Vclamp)$$

In addition, a compensation circuit having transistors Q11, Q12, and Q13 serves to compensate the base current of the buffer transistor Q14. The transistor Q11 is of the same type as that of the transistor Q14, and prevents the charging of the capacitor C by the base current of the transistor Q14 during a low period of a clamp pulse by equating IB3 to IB2, that is, (IB3/βQ14) to (IB2/βQ11).

The feed-back operation of the output from the first noise remover 36 to the DC clamp 60 is the same as that of the output from the second noise remover 38 to the DC clamp 60.

FIG. 6 illustrates a specific embodiment of the sample-and-hold circuits used in the present invention. Referring to FIG. 6, as shown in the operating waveforms of FIGS. 4E and 4H, sample-and-hold circuits sample an input signal in a resistor R1 and a capacitor C by activating transistors Q1, Q2, Q5, and Q6 according to the mean value Vth of the high and low values of the sampling pulse and the comparison operation of the transistors Q4 and Q5, during a sampling operation. On the other hand, during a holding operation, the capacitor C holds the charge until the next sampling period by deactivating the transistors Q5 and Q6. Here, a circuit constituted of transistors Q7, Q8, and Q10 is a compensation circuit for preventing the charging of the capacitor C due to the base current of a buffer transistor Q9.

FIG. 7 illustrates a specific embodiment of the level correctors 26 and 28. Referring to FIG. 7, the level correctors 26 and 28 compensate for the shift of the DC level between the input and the output when the sample-and-hold circuits operate, thus serving as a supplementary circuit to the noise removers 36 and 38. That is, the level correctors 26 and 28 equate the bias current sources IB1 ... IB4 to the bias current sources IB1 ... IB4 of the sample-and-hold circuit shown in FIG. 6, respectively, and employ the same type of transistors Q1, Q2, Q6, Q7, Q8, and Q9, and resistors R1, R2, and R3 having the same values, so that the DC level determined by the voltage value Vbe between the base and emitter of each transistor is coincided with other DC levels.

FIG. 8 illustrates a specific embodiment of the noise removers 36 and 38 used in the present invention. The noise removers 36 and 38 shown in FIG. 8 are the same in operation and structure. The output generation of the second noise remover 38 as constituted above will be described with reference to FIGS. 9A to 9E.

Upon receiving the outputs of the second level corrector 28 and the fifth sample-and-hold circuit 32 shown in FIGS. 9B and 9C, respectively, the second noise remover 38 alternately outputs the outputs of the second level corrector 28 and the fifth sample-and-hold circuit 32 according to the first sampling pulse shown in FIG. 9D. That is, when the first sampling pulse is high, a transistor Q14 of the second noise remover 38 is activated, thus passing only the output of the second level corrector 28. When the first sampling pulse is low, transistor Q13 of the second noise remover 38 is activated, thus passing only the output of the fifth sample-and-hold circuit 32. Consequently, the sampling noise shown in FIG. 9B is removed. Therefore, a waveform free of the sampling noise is finally output from the second noise remover 38, as shown in FIG. 9E.

As described above, the CDS device of the present invention has level correcting device and noise removing device, thereby offering the advantage of a more efficient elimination of the sampling noise.

The present invention is not limited to the above embodiment, and it is clearly understood that many variations are possible within the scope and spirit of the present invention by a person skilled in the art.

What is claimed is:

1. A correlative double sampling device comprising:
   at least two sample-and-hold circuits, each for sampling a video signal and outputting a predetermined DC level signal;
   a clamping circuit for DC clamping an input video signal and supplying a DC-clamped signal to said sample-and-hold circuits;
   at least two re-sample-and-hold circuits for re-sampling the DC level signal from said sample-and-hold circuits;
   a level correcting portion for correcting an output level of one of said sample-and-hold circuits and an output level of one of said re-sample-and-hold circuits, and outputting corrected signals whose phases are synchronized with outputs of said re-sample-and-hold circuits;

a noise remover circuit alternately passing output signals of said re-sample-and-hold circuits and said level correcting portion; and a differential amplifier for amplifying the difference between output signals of said noise remover circuit.

2. A correlative double sampling device as claimed in claim 1, wherein a predetermined sampling pulse is applied to said sample-and-hold circuits and to said noise remover circuit.

3. A correlative double sampling device as claimed in claim 1, wherein said noise remover circuit delivers outputs of said level correcting portion and said re-sample-and-hold circuits according to high/low level of a sampling pulse applied to said noise remover circuit.

4. A correlative double sampling device as claimed in claim 2, wherein said noise remover circuit delivers outputs of said level correcting portion and said re-sample-and-hold circuits when said predetermined sampling pulse is high and low, respectively.

5. A correlative double sampling device as claimed in claim 2, wherein said predetermined sampling pulse is also applied to one of said re-sample-and-hold circuits.

6. A correlative double sampling device as claimed in claim 3, wherein said sampling pulse is also applied to said sample-and-hold circuits and to one of said re-sample-and-hold circuits.

7. A correlative double sampling device as claimed in claim 1, wherein said output signals of said noise remover circuit are fed back to said clamping circuit.

8. A correlative double sampling device as claimed in claim 1, wherein said clamping circuit comprises a current mirror circuit and a charge and discharge circuit.

9. A correlative double sampling device as claimed in claim 1, wherein said sample-and-hold circuits and said re-sample-and-hold circuits comprise:

a charge and discharge circuit which sample-and-hold a predetermined input voltage; and a switching means which is activated and deactivated by a charge and discharge of said charge and discharge circuit; and a means for preventing a charge operation of said charge and discharge circuit during sampling of said predetermined input voltage.

10. A correlative double sampling device comprising:

a clamping circuit for DC-clamping an input video signal and supplying a DC-clamped signal to both first and second sample-and-hold circuits, wherein said first and second sample-and-hold circuits sample said DC-clamped signal and output a respective first and second predetermined DC level signal;

first and second re-sample-and-hold circuits for re-sampling said predetermined DC level signals of said first and second sample-and-hold circuits respectively and outputting first and second re-sample outputs, a third re-sample-and-hold circuit for re-sampling the output of said first re-sample-and-hold circuit and outputting a third re-sample output;

first and second level correcting circuits for adjusting a portion of said first re-sample output and said second predetermined DC level signal respectively and outputting respective first and second corrected outputs, wherein the DC level of said first and second corrected outputs equals the DC level of said third and second re-sample outputs respectively;

a first noise remover circuit alternately passing said third re-sample output and said first corrected output;

a second noise remover circuit alternately passing said second re-sample output and said second corrected output; and a differential amplifier for outputting a difference signal between the outputs of said first and second noise remover circuits.

11. A correlative double sampling device as claimed in claim 10, wherein a first sampling pulse is applied to said first sample-and-hold circuit, said second re-sample-and-hold circuit and to said first and second noise remover circuits.

12. A correlative double sampling device as claimed in claim 10, wherein said first noise remover circuit alternately passes said third re-sample output and said first corrected output depending on whether said first sampling pulse is high or low.

13. A correlative double sampling device as claimed in claim 10, wherein said second noise remover circuit alternately passes said second re-sample output and said second corrected output depending on whether said first sampling pulse is high or low.

14. A correlative double sampling device as claimed in claim 10, wherein said first noise remover circuit passes said first corrected output when said first sampling pulse is high and passes said third re-sample output when said first sample pulse is low.

15. A correlative double sampling device as claimed in claim 10, wherein said second noise remover circuit passes said second corrected output when said first sampling pulse is high and passes said second re-sample output when said first sample pulse is low.

16. A correlative double sampling device as claimed in claim 10, wherein a second sampling pulse is applied to said first re-sample-and-hold circuit and said second sample-and-hold circuit.

17. A correlative double sampling device as claimed in claim 10, wherein said first and second corrected outputs are fed back to said clamping circuit.

18. A correlative double sampling device as claimed in claim 10, wherein said clamping circuit comprises a current mirror circuit and a charge and discharge circuit.

19. A correlative double sampling device as claimed in claim 10, wherein said sample-and-hold circuits and said re-sample-and-hold circuits comprise:

a charge and discharge circuit which sample-and-hold a predetermined input voltage; and a switching means which is activated and deactivated by said charge and discharge circuit; and a means for preventing said charge and discharge circuit from operating during the sampling of said predetermined input voltage.

* * * * *